US010377354B2

(12) United States Patent
Kitagawa et al.

(10) Patent No.: US 10,377,354 B2
(45) **Date of Patent: *Aug. 13, 2019**

(54) VEHICLE SPEED MANAGEMENT APPARATUS AND VEHICLE SPEED MANAGEMENT METHOD

(71) Applicant: DENSO CORPORATION, Kariya, Aichi-pref. (JP)

(72) Inventors: Nozomi Kitagawa, Kariya (JP); Norio Yamamoto, Kariya (JP)

(73) Assignee: DENSO CORPORATION, Kariya, Aichi-pref. (JP)

( * ) Notice: Subject to any disclaimer, the term of this patent is extended or adjusted under 35 U.S.C. 154(b) by 0 days.

This patent is subject to a terminal disclaimer.

(21) Appl. No.: 15/549,456

(22) PCT Filed: Feb. 1, 2016

(86) PCT No.: PCT/JP2016/000483
§ 371 (c)(1),
(2) Date: Aug. 8, 2017

(87) PCT Pub. No.: WO2016/129232
PCT Pub. Date: Aug. 18, 2016

(65) Prior Publication Data

US 2018/0022327 A1 Jan. 25, 2018

(30) Foreign Application Priority Data

Feb. 9, 2015 (JP) ................................ 2015-023618

(51) Int. Cl.
*B60T 7/12* (2006.01)
*B60T 7/22* (2006.01)
(Continued)

(52) U.S. Cl.
CPC .................. *B60T 7/12* (2013.01); *B60T 7/22* (2013.01); *B60W 10/18* (2013.01); *B60W 10/20* (2013.01);
(Continued)

(58) Field of Classification Search
CPC ......... B60T 7/12; B60T 7/22; G06K 9/00791; G08G 1/165
See application file for complete search history.

(56) References Cited

U.S. PATENT DOCUMENTS 6,362,729 B1 3/2002 Hellmann et al.
7,102,495 B2 * 9/2006 Mattes .............. B60K 31/0008 180/276
(Continued)

FOREIGN PATENT DOCUMENTS

JP 2000-177429 A 6/2000
JP 2003-528763 A 9/2003
(Continued)

*Primary Examiner* — Faye M Fleming
(74) *Attorney, Agent, or Firm* — Knobbe, Martens, Olson & Bear, LLP

(57) ABSTRACT

A vehicle speed management apparatus acquires scene information about a driving scene of a host vehicle, estimates the driving scene based on the scene information acquired, acquires behavior information about a driving behavior of a user, determines a driving risk of the host vehicle driven by the user, based on the driving scene estimated and on the behavior information acquired, and controls a presentation of assist information by an information presentation unit in order to prompt the user to address the driving risk. When the driving scene estimated represents an independent traveling state of the host vehicle, the assist information to be presented by the information presentation unit is selected based on a magnitude of the driving risk determined before an operation by an emergency control unit.

6 Claims, 13 Drawing Sheets

(51) Int. Cl.

| | |
|---|---|
| ***G06K 9/00*** | (2006.01) |
| ***G08G 1/16*** | (2006.01) |
| ***B60W 10/18*** | (2012.01) |
| ***B60W 10/20*** | (2006.01) |
| ***B60W 40/08*** | (2012.01) |
| ***B62D 15/02*** | (2006.01) |

(52) U.S. Cl.
CPC ......... *B60W 40/08* (2013.01); *B62D 15/0265* (2013.01); *G06K 9/00791* (2013.01); *G08G 1/165* (2013.01); *G08G 1/166* (2013.01); *B60T 2201/02* (2013.01)

(56) References Cited

U.S. PATENT DOCUMENTS

| | | | | |
|---|---|---|---|---|
| 7,145,441 | B2 * | 12/2006 | Knoop ................... | B60Q 9/008 340/435 |
| 7,689,361 | B2 * | 3/2010 | Hijikata ................ | B60W 50/16 701/301 |
| 8,060,305 | B2 * | 11/2011 | Kimura ................. | B60W 40/02 340/436 |
| 2003/0130783 | A1 | 7/2003 | Hellmann et al. | |
| 2011/0118929 | A1 | 5/2011 | Takae et al. | |
| 2011/0238278 | A1 | 9/2011 | Nishiyama et al. | |
| 2018/0025643 | A1 * | 1/2018 | Yamamoto ............ | B60W 50/14 701/23 |

FOREIGN PATENT DOCUMENTS

| | | | |
|---|---|---|---|
| JP | 2007-223505 | A | 9/2007 |
| JP | 2008-222123 | A | 9/2008 |
| JP | 2008-225815 | A1 | 9/2008 |
| JP | 2009-043145 | A | 2/2009 |
| JP | 2009-179248 | A | 8/2009 |
| JP | 2010-20365 | A | 1/2010 |
| JP | 5116647 | B2 | 1/2013 |
| JP | 2013-254409 | A | 12/2013 |
| WO | 2016/129231 | A1 | 8/2016 |

* cited by examiner

| DRIVE SCENE | DETAILS |
|---|---|
| D0 | NEED INTER-VEHICLE MANAGEMENT |
| D1 | LEAD TO MISINTERPRETATION OF INFO REQUIRED TO DRIVE |
| D2 | CAUSE LACK OF INFO REQUIRED TO DRIVE |
| D3 | INCREASE AMOUNT OF INFO REQUIRED TO DRIVE |
| D4 | INCREASE NUMBER OF MANIPULATION TASKS REQUIRED TO DRIVE |
| D5 | ACCELERATE OR INHIBIT DECELERATION BY NATURAL PROCESS |
| D6 | REQUIRE TO FOLLOW LEGAL SPEED LIMIT |

FIG. 8

| | DRIVE RISK | FACTOR C1 | FACTOR C2 | FACTOR C3 |
|---|---|---|---|---|
| (a) | LOW RISK Rl | DOWNHILL | — | — |
| (b) | | PARKED VEHICLE | — | |
| (c) | MEDIUM RISK Rm | DOWNHILL | PARKED VEHICLE | — |
| (d) | | DOWNHILL | GRADIENT INCREASE | — |
| (e) | HIGH RISK Rh | DOWNHILL | PARKED VEHICLE | EXCEED SPEED ACCELERATE/UNIFORM SPEED |
| (f) | | DOWNHILL | GRADIENT INCREASE | EXCEED SPEED ACCELERATE/UNIFORM SPEED |

FIG. 9

| | DRIVE RISK | ASSIST INFO | VISUAL PRESENT | AUDIBLE PRESENT | HAPTICAL PRESENT |
|---|---|---|---|---|---|
| (A) | LOW RISK Rl | REFERENCE INFO | ○ | — | — |
| (B) | MEDIUM RISK Rm | SUGGEST INFO | ○ | ○ | — |
| (C) | HIGH RISK Rh | REQUEST INFO | ○ | ○ | ○ |

| | DRIVE RISK FINAL DETERMINE | | |
|---|---|---|---|
| RISK FLAG | LOW RISK Rl | MEDIUM RISK Rm | HIGH RISK Rh |
| LOW RISK FLAG Fl | 1 | 1 | 1 |
| MEDIUM RISK FLAG Fm | 0 | 1 | 1 |
| HIGH RISK FLAG Fh | 0 | 0 | 1 |

VEHICLE SPEED MANAGEMENT APPARATUS AND VEHICLE SPEED MANAGEMENT METHOD

CROSS REFERENCE TO RELATED APPLICATION

The present application is based on Japanese Patent Application No. 2015-23618 filed on Feb. 9, 2015, the disclosure of which is incorporated herein by reference.

TECHNICAL FIELD

The present disclosure relates to a vehicle speed management apparatus and a method for managing the vehicle speed of a host vehicle.

BACKGROUND ART

In general, the vehicle speed has been intuitively managed based on a vehicle speed indication given by a display unit in a vehicle and on a driving scene of the vehicle. However, such intuitive vehicle speed management largely depends on the driving skill, mental state, and risk sensitivity of a user.

According to a vehicle speed management technology disclosed in Patent Literature 1, an emergency control unit is mounted in a vehicle. This emergency control unit operates to reduce or avoid collision damage to a preceding obstacle. When the emergency control unit operates, braking control is automatically exercised to forcibly reduce the vehicle speed if it is determined that there is a high driving risk for the user of the host vehicle mounted with the emergency control unit. The safety and comfort of the user can thereby be assured.

PRIOR ART LITERATURES

Patent Literature

Patent Literature 1: JP 2000-177429 A

SUMMARY OF INVENTION

If it is determined that collision with a preceding vehicle cannot be avoided even if the emergency control unit operates to decelerate the host vehicle, the vehicle speed management technology disclosed in Patent Literature 1 issues a warning to the user. In this instance, whether the warning should be issued is determined based on a relative relationship to the preceding vehicle, such as an inter-vehicle distance or a relative speed. Therefore, in a driving scene where, for example, a different vehicle in a blind spot abruptly cuts in front of the host vehicle, the warning may not be issued in time so that the safety and comfort of the user are interfered with. Further, a safe speed with respect to a driving risk intrinsically changes from moment to moment with the driving scene and driving behavior of the host vehicle driven by the user. Therefore, issuing a warning based only on the relative relationship to the preceding vehicle is not adequate for assuring the safety and comfort of the user.

It is an object of the present disclosure to provide a vehicle speed management apparatus and a method for assuring the safety and comfort of the user by managing the vehicle speed of the host vehicle.

To achieve the above object, according to a first example, a vehicle speed management apparatus is provided to manage a vehicle speed in a host vehicle. The host vehicle includes an emergency control unit and an information presentation unit. The emergency control unit provides an operation in order to reduce or avoid collision damage to a preceding obstacle. The information presentation unit presents information. The vehicle speed management apparatus includes at least one processor that includes: a scene information acquisition section that acquires scene information about a driving scene of the host vehicle driven by a user; a scene estimation section that estimates the driving scene based on the scene information acquired by the scene information acquisition section; a behavior information acquisition section that acquires behavior information about a driving behavior of the host vehicle driven by the user; a risk determination section that determines a driving risk of the host vehicle driven by the user, based on the driving scene estimated by the scene estimation section and on the behavior information acquired by the behavior information acquisition section; and an information presentation control section that controls a presentation of assist information by the information presentation unit in order to prompt the user to address the driving risk. When the driving scene estimated by the scene estimation section represents an independent traveling state of the host vehicle, the information presentation control section selects, based on a magnitude of the driving risk determined by the risk determination section, the assist information to be presented by the information presentation unit before the operation by the emergency control unit.

According to a second example, a vehicle speed management method is provided to manage a vehicle speed in a host vehicle. The host vehicle includes an emergency control unit providing an operation in order to reduce or avoid collision damage to a preceding obstacle and an information presentation unit presenting information. The vehicle speed management method, as steps executed by at least one processor, includes: a scene information acquisition step that acquires scene information about a driving scene of the host vehicle driven by a user; a scene estimation step that estimates the driving scene based on the scene information acquired by the scene information acquisition step; a behavior information acquisition step that acquires behavior information about a driving behavior of the host vehicle driven by the user; a risk determination step that determines a driving risk of the host vehicle driven by the user, based on the driving scene estimated by the scene estimation step and on the behavior information acquired by the behavior information acquisition step; and an information presentation control step that controls a presentation of assist information by the information presentation unit in order to prompt the user to address the driving risk, and selects the assist information to be presented by the information presentation unit before the operation by the emergency control unit based on a magnitude of the driving risk determined by the risk determination step when the driving scene estimated by the scene estimation step represents an independent traveling state of the host vehicle.

According to the first and second examples, when the estimated driving scene is the independent traveling state of the host vehicle, the assist information prompting for addressing the driving risk is selected based on the magnitude of the driving risk and presented by the information presentation unit before the operation of the emergency control unit. In this instance, the driving risk is determined based on the driving scene estimated according to the scene information and on the behavior information about the driving behavior. The assist information for managing the vehicle speed is then presented based on the magnitude of the driving risk that is dependent on the driving scene and the driving behavior. The user can thereby be prompted to address the driving risk in order to assure safety and comfort.

BRIEF DESCRIPTION OF DRAWINGS

The above and other objects, features and advantages of the present disclosure will become more apparent from the following detailed description made with reference to the accompanying drawings. In the drawings:

FIG. 8 is a diagram illustrating driving scenes that cause driving risks determined by a risk determination block in FIG. 6;

FIG. 9 is a diagram illustrating the relationship between assist information presented by an information presentation control block in FIG. 6, an assist information presentation mode, and a driving risk;

EMBODIMENTS FOR CARRYING OUT INVENTION

First Embodiment

Figure 1:
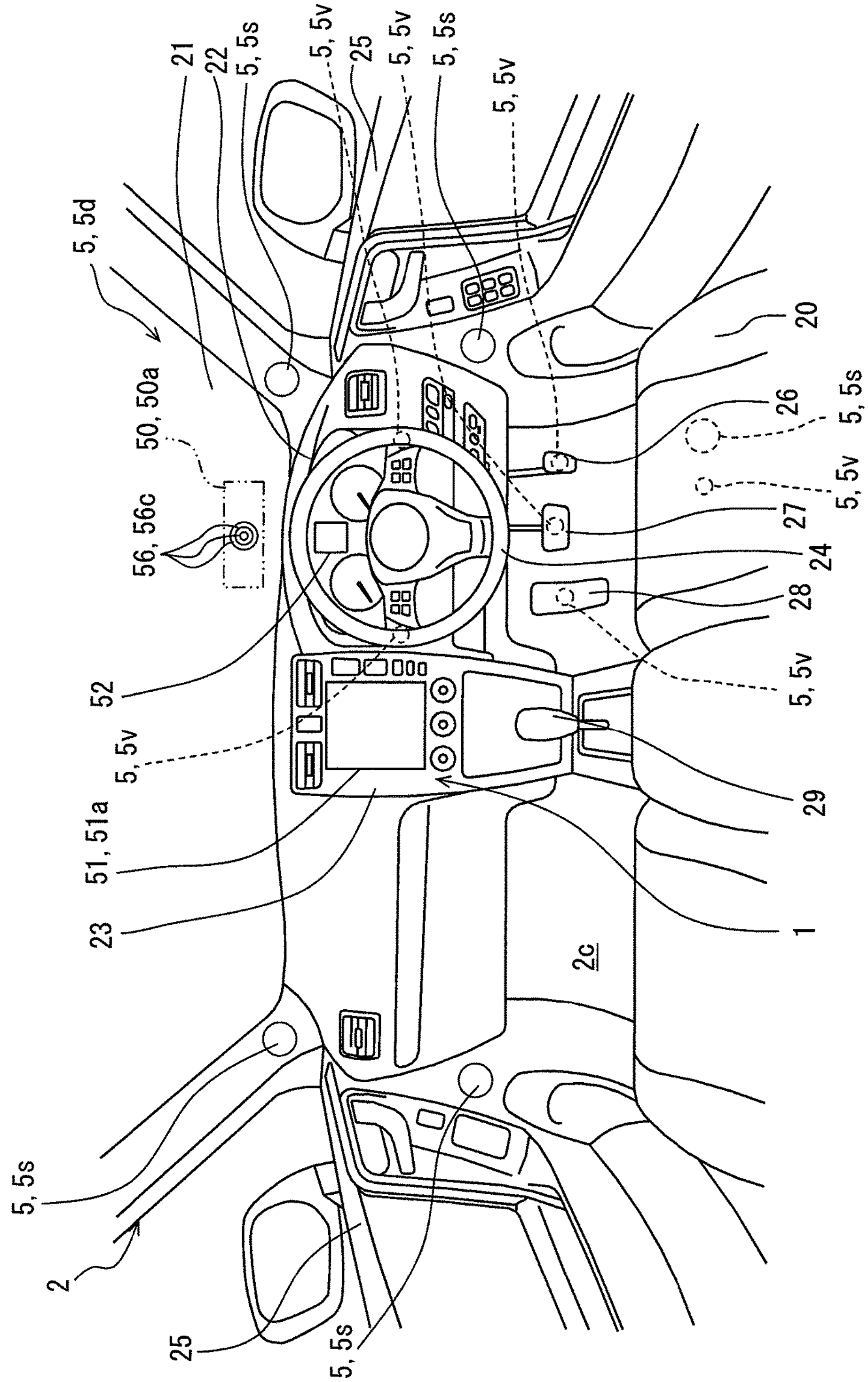
FIG. 1 is an interior view illustrating a vehicle compartment of a host vehicle in which a travel assist system according to a first embodiment is mounted.
Figure 2:
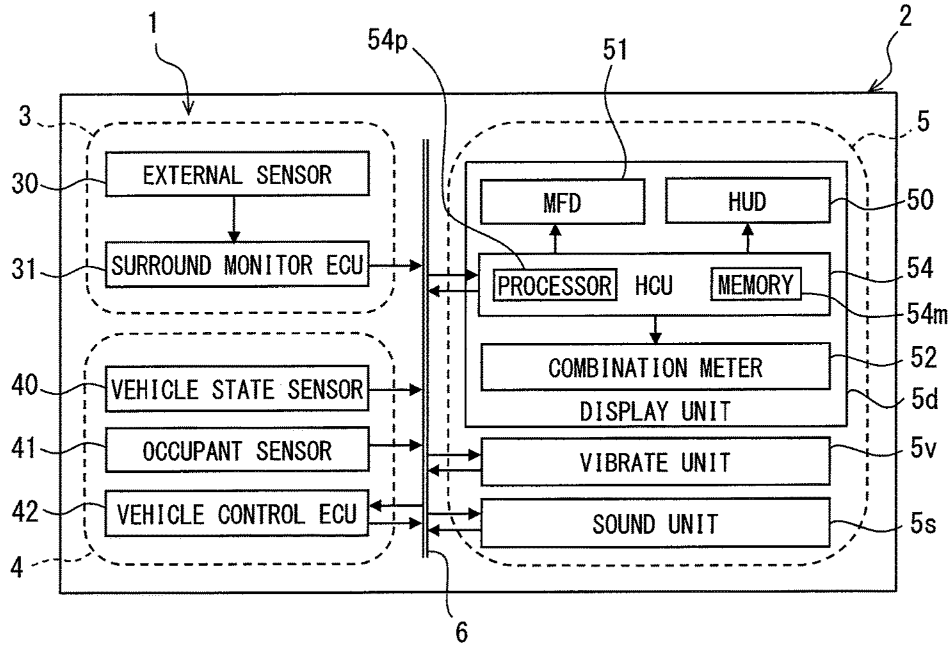
FIG. 2 is a block diagram illustrating the travel assist system according to the first embodiment.

A travel assist system 1 according to a first embodiment of the present disclosure is mounted in a vehicle 2 as in FIGS. 1 and 2. The vehicle 2 in which the travel assist system 1 is mounted may be referred to as the host vehicle 2 or the subject vehicle 2. A speed at which the host vehicle 2 travels is referred to as the vehicle speed. A road on which the host vehicle 2 travels is referred to as the travel path. A limit on the vehicle speed of the host vehicle 2 on the travel path is referred to as the speed limit.

As in FIG. 2, the travel assist system 1 includes a surroundings monitoring subsystem 3, a vehicle control subsystem 4, and an information presentation subsystem 5. These subsystems 3, 4, 5 of the travel assist system 1 are connected through an in-vehicle network 6 such as a LAN (Local Area Network).

The surroundings monitoring subsystem 3 includes an external sensor 30 and a surroundings monitoring ECU (Electronic Control Unit) 31. The external sensor 30 detects a different vehicle, an artificial structure, a human, and an animal, and other obstacles that exist outside of the host vehicle 2 and may collide with the host vehicle 2. The external sensor 30 also detects a traffic sign installed outside of the host vehicle 2. The external sensor 30 is formed of one or more types of elements such as a sonar, a radar, and a camera.

More specifically, the sonar is an ultrasonic sensor mounted, for example, on the front or rear of the host vehicle 2. The sonar outputs a detection signal when it detects an obstacle in a detection area outside of the host vehicle 2 by transmitting an ultrasonic wave to the detection area and receiving the reflection of the transmitted ultrasonic wave. The radar is a millimeter wave sensor or a laser sensor that is mounted, for example, on the front or rear of the host vehicle 2. The radar outputs a detection signal when it detects an obstacle in a detection area outside of the host vehicle 2 by transmitting a millimeter wave, a quasi-millimeter wave, or a laser beam to the detection area and receiving the reflection of the transmitted wave or laser beam. The camera is a monocular camera or a compound-eye camera that is mounted, for example, on a rear-view mirror or side-view mirror of the host vehicle 2. The camera outputs an image signal when it detects an obstacle or a traffic sign in a detection area outside of the host vehicle 2 by capturing an image of the detection area.

The surroundings monitoring ECU 31 in FIG. 2 mainly includes a microcomputer having a processor and a memory, and is connected to the external sensor 30 and to the in-vehicle network 6. Based on an output signal of the external sensor 30, the surroundings monitoring ECU 31 acquires traffic sign information, such as the information about a speed limit sign, a stop sign, an intersection sign, an entry or exit sign, a tunnel sign, or a gradient sign, and line marking information, such as the information about a white line or a yellow line. Additionally, based on an output signal of the external sensor 30, the surroundings monitoring ECU 31 acquires obstacle information such as the type of obstacle and the relationship of an obstacle to the host vehicle 2. Particularly, the obstacle information acquired by the surroundings monitoring ECU 31 includes the information about the relationship between the host vehicle 2 and a preceding vehicle acting as a preceding obstacle. The relationship information indicates, for example, an inter-vehicle distance, an inter-vehicle time, a relative speed, and a predicted time to collision (TTC). The inter-vehicle time is the time obtained by dividing the inter-vehicle distance by the vehicle speed. The TTC is the time obtained by dividing the inter-vehicle distance by the relative speed.

The vehicle control subsystem 4 includes a vehicle state sensor 40, an occupant sensor 41, and a vehicle control ECU 42. The vehicle state sensor 40 is connected to the in-vehicle network 6. The vehicle state sensor 40 detects the travel state of the host vehicle 2. The vehicle state sensor 40 is formed of one or more types of elements such as a vehicle speed sensor, a rotation speed sensor, a tire wheel velocity sensor, an acceleration sensor, a steering angle sensor, an illuminance sensor, an ambient temperature sensor, a fuel sensor, a water temperature sensor, a battery sensor, and a radio receiver.

More specifically, the vehicle speed sensor detects the vehicle speed of the host vehicle 2 and outputs a vehicle speed signal based on the detection. The rotation speed sensor detects the engine rotation speed of the host vehicle 2 and outputs a rotation speed signal based on the detection. The tire wheel velocity sensor detects the rotation speed of a tire wheel of the host vehicle 2 and outputs a tire wheel velocity signal based on the detection. The acceleration sensor detects acceleration exerted on the host vehicle 2 and outputs an acceleration signal based on the detection. The steering angle sensor detects the steering angle of the host vehicle 2 and outputs a steering angle signal based on the detection. The illuminance sensor detects illuminance in the outside of the host vehicle 2 and outputs an illuminance signal based on the detection. The ambient temperature sensor detects temperature in the outside of the host vehicle 2 and outputs an ambient temperature signal based on the detection. The fuel sensor detects a remaining fuel level in a fuel tank of the host vehicle 2 and outputs a fuel signal based on the detection. The water temperature sensor detects the cooling water temperature of an internal combustion engine in the host vehicle 2 and outputs a water temperature signal based on the detection. The battery sensor detects a remaining battery level of the host vehicle 2 and outputs a battery signal based on the detection.

The radio receiver receives an output wave from, for example, a roadside unit for road-to-vehicle communication and outputs a weather signal indicative of weather conditions at, for example, the current or future traveling position of the host vehicle 2. Further, the radio receiver outputs a traffic signal by receiving output waves, for example, from a positioning satellite, a vehicle-to-vehicle communication transmitter on a different vehicle, and a roadside unit for road-to-vehicle communication. The traffic signal represents the above obstacle information as well as traffic information concerning the host vehicle 2, such as the traveling position, travel speed, travel time, travel path conditions, and speed limit.

The occupant sensor 41 is connected to the in-vehicle network 6. The occupant sensor 41 detects the state or manipulation of a user in a vehicle compartment 2*c* of the host vehicle 2 in FIG. 1. The occupant sensor 41 is formed of one or more types of elements such as a power switch, a user status monitor, a display setting switch, a light switch, a turn switch, a wiper switch, a shift switch, a vehicle speed management switch, and a cruise control switch.

More specifically, when manipulated to the ON position by the user in the vehicle compartment 2*c* in order to start an internal combustion engine or electric motor of the host vehicle 2, the power switch outputs a power signal based on the manipulation. The user status monitor uses an image sensor to capture an image of the user on a driver seat 20 in the vehicle compartment 2*c*, detects the state of the user, and outputs a relevant image signal. When manipulated by the user in order to set a display state in the vehicle compartment 2*c*, the display setting switch outputs a display setting signal based on the manipulation. When manipulated to the ON position by the user in the vehicle compartment 2*c* in order to illuminate various lights of the host vehicle 2, the light switch outputs a light signal based on the manipulation. When manipulated to the ON position by the user in the vehicle compartment 2*c* in order to operate a direction indicator of the host vehicle 2, the turn switch outputs a turn signal based on the manipulation. When manipulated to the ON position by the user in the vehicle compartment 2*c* in order to operate a wiper of the host vehicle 2, the wiper switch outputs a wiper signal based on the manipulation. When a shift lever 29 is manipulated by the user in the vehicle compartment 2*c* in order to change the shift position of a transmission of the host vehicle 2, the shift switch detects the changed shift position and outputs a shift signal based on the detection.

The vehicle speed management switch is used to exercise vehicle speed management over the vehicle speed of the host vehicle 2. When manipulated to the ON position by the user in the vehicle compartment 2*c*, the vehicle speed management switch outputs a management signal based on the manipulation. The cruise control switch is used to automatically control the inter-vehicle distance between the host vehicle 2 and the preceding vehicle or the vehicle speed of the host vehicle 2. When manipulated to the ON position by the user in the vehicle compartment 2*c*, the cruise control switch outputs a cruise signal based on the manipulation. The first embodiment is configured so that only one of the vehicle speed management switch and the cruise control switch can be selectively turned on. That is, the vehicle speed management switch can be turned on while the cruise control switch is off. In fact, vehicle speed management in the present embodiment is exercised so that information for directing the user engaged in driving to perform safe driving is presented based on a later-described driving risk without automatically controlling the vehicle speed or inter-vehicle distance of the host vehicle 2. Accordingly, a state where the cruise control switch is off and the vehicle speed management switch is on is hereinafter referred to as the "vehicle speed management enabled state."

The vehicle control ECU 42 in FIG. 2 mainly includes a microcomputer having a processor and a memory, and is connected to the in-vehicle network 6. The vehicle control ECU 42 is formed of one or more types of elements such as an engine control ECU, an electric motor control ECU, a brake control ECU, and an integrated control ECU, and includes at least the integrated control ECU.

Specifically, the engine control ECU increases or decreases the vehicle speed of the host vehicle 2 by controlling the operations of an engine throttle actuator and a fuel injection valve based on the manipulation of an accelerator pedal 26 (see FIG. 1) or by automatically controlling such operations. The electric motor control ECU increases or decreases the vehicle speed of the host vehicle 2 by controlling the operation of a motor-generator based on the manipulation of the accelerator pedal 26 or by automatically controlling such an operation. The brake control ECU increases or decreases the vehicle speed of the host vehicle 2 by controlling the operation of a brake actuator based on the manipulation of a brake pedal 27 (see FIG. 1) or by automatically controlling such an operation.

The integrated control ECU provides synchronization control over the operation of a different control ECU operating as the vehicle control ECU 42 based on output signals of the sensors 40, 41, information acquired by the surroundings monitoring ECU 31, and control information in the different control ECU. Particularly, the integrated control ECU in the present embodiment operates as an "emergency control unit" in order to automatically reduce or avoid collision damage between the host vehicle 2 and a preceding obstacle, such as a preceding vehicle, by issuing a control command to the different control ECU operating as the vehicle control ECU 42. Particularly when an emergency control condition is established, the integrated control ECU in the present embodiment automatically exercises an autonomous emergency braking (AEB) to forcibly reduce the vehicle speed of the host vehicle 2. The emergency control condition for AEB is, for example, that the TTC is 5 seconds or shorter.

When the cruise control switch is turned on by the user, the integrated control ECU in the present embodiment exercises a full speed range adaptive cruise control (FSRA) to automatically control the inter-vehicle distance or vehicle speed of the host vehicle 2 over a full vehicle speed range. If no preceding vehicle exists in this instance, the integrated control ECU exercises the FSRA in order to keep the host vehicle 2 at a user-selected vehicle speed. By contrast, if a preceding vehicle exists, the integrated control ECU exercises the FSRA so that the inter-vehicle distance between the host vehicle 2 and the preceding vehicle is equal to or longer than a user-selected distance, and that the vehicle speed of the host vehicle 2 is equal to or lower than a user-selected one. Here, the user-selected inter-vehicle distance varies with the vehicle speed of the host vehicle 2. If, for example, the host vehicle 2 is traveling on an expressway under normal conditions, the FSRA is exercised so that the inter-vehicle distance between the host vehicle 2 and the preceding vehicle is 60 m or longer (equivalent to an inter-vehicle time of 2 seconds or longer), or that the vehicle speed of the host vehicle 2 is 100 km/h or lower.

When the emergency control condition is established, the AEB is exercised without regard to the status of the cruise control switch or vehicle speed management switch. That is, when the emergency control condition (e.g., TTC) is met, the AEB is executed to perform an interrupt process even if FSRA or vehicle speed management is being exercised. While the AEB is executed, the FSRA and vehicle speed management function are disabled.

The information presentation subsystem 5 includes a sound unit 5*s*, a vibration unit 5*v*, and a display unit 5*d*. These units 5*s*, 5*v*, 5*d* each function as an "information presentation unit."

The sound unit 5*s* is mounted in the host vehicle 2 to audibly present information. The sound unit 5*s* mainly includes a loudspeaker and a sound source circuit, and is connected to the in-vehicle network 6. The sound unit 5*s* is mounted at one or more of, for instance, the driver seat 20, an instrument panel 22, and a door 25 in the vehicle compartment 2*c* of the host vehicle 2 as in FIG. 1 in order to emit a notification sound wave or voice that is perceivable by the user on the driver seat 20.

The vibration unit 5*v* in FIG. 2 is mounted in the host vehicle 2 to haptically present information. The vibration unit 5*v* mainly includes a vibration actuator, and is connected to the in-vehicle network 6. The vibration unit 5*v* is mounted at one or more of the driver seat 20, a steering wheel 24, the accelerator pedal 26, the brake pedal 27, and a footrest 28 in the vehicle compartment 2*c* in FIG. 1 in order to emit a notification vibration that is perceivable by the user on the driver seat 20.

The display unit 5*d* in FIG. 2 is mounted in the host vehicle 2 to visually present information. The display unit 5*d* includes a HUD (Head-up Display) 50, an MFD (Multi-Function Display) 51, a combination meter 52, and an HCU (HMI (Human Machine Interface) Control Unit) 54.

Figure 3:
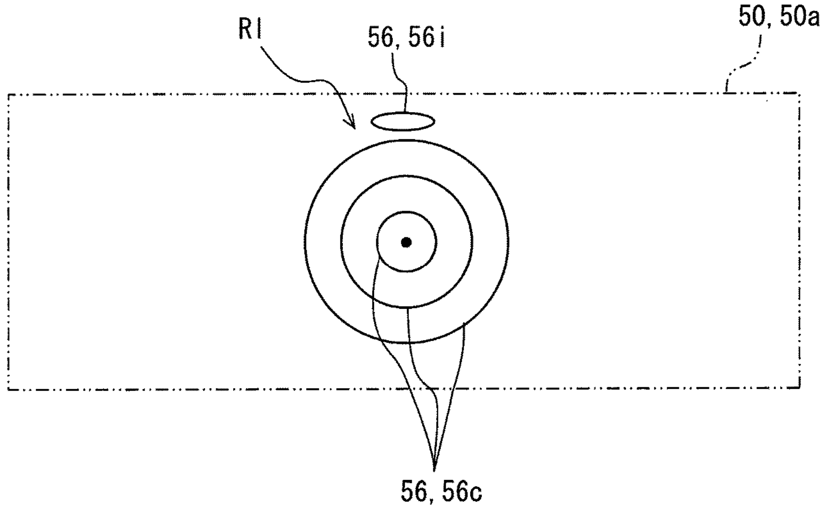
FIG. 3 is a front view illustrating information displayed by an HUD in FIG. 1.

The HUD 50 is mounted on the instrument panel 22 in the vehicle compartment 2*c* in FIG. 1. The HUD 50 projects, onto a windshield 21 of the host vehicle 2, an image 56 formed to display predetermined information on a liquid-crystal panel or a projection screen, in such a manner as to permit the user on the driver seat 20 to view a virtual image representative of the image 56. In this instance, the virtual image displayed by the HUD 50 is viewed by the user in combination with an outside scenery ahead of the host vehicle 2 within a display range 50*a* having a predetermined area, which is the range of projection of the image 56 onto the windshield 21. As in FIGS. 3 to 5, a warning image 56*c* and a notification image 56*i* are adopted as the virtual image displayed by the HUD 50. In addition to the images 56*c*, 56*i*, an image representative of one or more types of information such as navigation information, traffic sign information, and obstacle information, may be presented as the virtual image displayed by the HUD 50. When a combiner is mounted on the instrument panel 22 and used in coordination with the windshield 21 to make the outside scenery visible through the combiner, the virtual image can also be displayed by projecting the image 56 onto the combiner. The above navigation information can be acquired, for example, by the later-detailed HCU 54 based on map information stored in a memory 54*m* and an output signal of the sensor 40.

The MFD 51 is mounted on a center console 23 in the vehicle compartment 2*c* in FIG. 1. The MFD 51 displays a real image of the image 56 formed to display predetermined information on one or more liquid-crystal panels, in such a manner as to permit the user on the driver seat 20 to view the real image. In this instance, the real image displayed by the MFD 51 is viewed by the user within a display range 51*a* having a larger area than the display range 50*a* of the HUD 50. An image representative of one or more types of information such as navigation information, audio information, video information, and communication information, are presented as the real image displayed by the MFD 51.

The combination meter 52 is mounted on the instrument panel 22 in the vehicle compartment 2*c*. The combination meter 52 displays vehicle information about the host vehicle 2 in such a manner as to permit the user on the driver seat 20 to view the vehicle information. The combination meter 52 is a digital meter for presenting vehicle information with an image formed on a liquid-crystal panel or an analog meter for presenting vehicle information by moving a pointer across a scale. For example, one or more types of information indicative of the vehicle speed, the engine rotation speed, the remaining fuel level, the cooling water temperature, the remaining battery level, and the manipulations of the light switch, turn switch, shift switch, vehicle speed management switch, and cruise control switch are presented as the information displayed by the combination meter 52.

As in FIG. 2, the HCU 54 in the present embodiment, which is referred to also as the electronic control unit, is mainly formed of a microcomputer having a processor 54*p* and the memory 54*m*, and is connected to the display elements 50, 51, 52 of the display unit 5*d* and to the in-vehicle network 6. The HCU 54 provides synchronization control over the operations of the sound unit 5*s* and vibration unit 5*v* and the operations of the display elements 50, 51, 52 of the display unit 5*d*. In this instance, the HCU 54 exercises such operational control based, for example, on output signals of the sensors 40, 41, information acquired by the ECU 31, control information of the ECU 42, information stored in the memory 54*m*, and timing and other information acquired by the HCU 54. In the present embodiment, particularly, the HCU 54 functions as a "vehicle speed management apparatus" (which is referred to also as the "vehicle speed control apparatus") in order to exercise vehicle speed management. Therefore, the vehicle speed management function of the HCU 54 is described in detail below. A function implemented by the processor 54_p_ may be implemented by a plurality of processors.

Figures 6, 7:
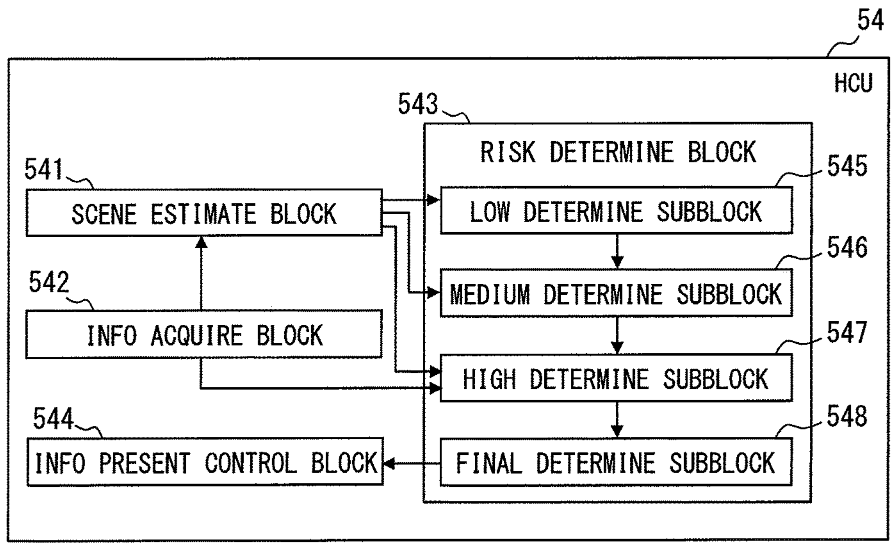
FIG. 6 is a block diagram illustrating a plurality of blocks formed by an HCU in FIG. 2.
FIG. 7 is an explanatory diagram illustrating driving scenes estimated by a scene estimation block in FIG. 6.

As in FIG. 6, the HCU 54 functionally builds a plurality of blocks 541, 542, 543, 544 by allowing the processor 54_p_ to execute a vehicle speed management program. These blocks are referred to also as sections, devices, modules, or units. Obviously, at least some of these blocks 541, 542, 543, 544 may be implemented by hardware such as one IC or a plurality of ICs.

A scene estimation block 541 functions as a "scene estimation section" and estimates driving scenes of the host vehicle 2, which is driven by the user, based on scene information acquired by an information acquisition block 542. In this instance, the driving scenes estimated by the scene estimation block 541 include at least scenes D0, D1, D2, D3, D4, D5, and D6 as in FIG. 7.

Scene D0 is a driving scene that requires vehicle speed management. More specifically, in the present embodiment, scene D0 particularly represents a situation where the host vehicle 2 is in an independent traveling state during the vehicle speed management enabled state before the AEB is exercised by the integrated control ECU. In the independent traveling state represented by scene D0, the vehicle speed is equal to or higher than a threshold value V0 and the inter-vehicle distance is equal to or longer than a threshold value L0 (see FIGS. 10 and 12). Scene information required for the assumption of scene D0 includes information about the vehicle speed, the inter-vehicle distance as obstacle information, the activation of the AEB, the manipulation of the cruise control switch (i.e., the activation of the FSRA), and the manipulation of the vehicle speed management switch. The threshold value V0 is set, for example, to 10 km/h as a boundary value for differentiating it from a slowed-down vehicle speed that reduces the driving risk of the host vehicle 2 driven by the user. The threshold value L0 is set, for example, to 100 m as a boundary value for differentiating it from the inter-vehicle distance in a follow-up traveling state where the host vehicle 2 is following a preceding vehicle and traveling in the same lane and in the same direction as the preceding vehicle. A state where the inter-vehicle distance is equal to or longer than the threshold value L0 includes a state where the inter-vehicle distance is infinite because there is substantially no preceding vehicle.

Scene D1 is a driving scene that may lead to misinterpretation of information required for driving the host vehicle 2 and causes the user to form an erroneous judgment or feeling concerning the driving risk. Scene D1 represents a state where a vehicle speed sensed by the user is likely to be different from the actual vehicle speed, that is, for example, the travel path switches from an expressway to a local road, is a tunnel, or is in a sagging area. Scene information required for the assumption of scene D1 includes one or more types of information such as sign information, traffic information, navigation information, information about vehicle speed, acceleration, engine rotation speed, illuminance, and user status, and information about the manipulations of the turn switch and light switch. The aforementioned expressway is a travel path having a higher legal speed limit than a local road. The legal speed limit is a maximum speed limit legally specified by an authority having jurisdiction. The aforementioned tunnel is a travel path formed, for example, by digging through a mountain or the underground, and includes a road that can be deemed to be a travel path. The aforementioned sagging area is an area where the gradient of a travel path gradually changes from downward to upward.

Scene D2 is a driving scene that may cause lack of information required for driving the host vehicle 2 and delay the user in determining the driving risk. More specifically, scene D2 represents a state where a blind spot is formed for the user, that is, for example, the host vehicle 2 is traveling at the top of an uphill, a structure exists in front of the user due to a curved or intersecting travel path, or a parked vehicle or a large vehicle exists forward on a travel path. Scene D2 also represents a state where the visibility of the user is decreased due, for instance, to rain, snow, fog, backlight, dazzle, or nighttime driving. Scene information required for the assumption of scene D2 includes one or more types of information such as sign information, line marking information, obstacle information, traffic information, navigation information, information about vehicle speed, acceleration, and engine rotation speed, weather information, timing information, and information about illuminance, ambient temperature, steering angle, and manipulations of the wiper switch and light switch. The aforementioned top of an uphill is an area where the gradient of a travel path gradually changes from upward to downward.

Scene D3 is a driving scene that may increase the amount of information required for driving the host vehicle 2 and cause the user to form an erroneous judgment concerning the driving risk. More specifically, scene D3 represents a state where, for example, multi-directional safety confirmation is required due to entry into an intersection. Scene information required for the assumption of scene D3 includes one or more types of information such as sign information, traffic information, and navigation information.

Scene D4 is a driving scene that may increase the number of manipulation tasks required for driving the host vehicle 2 and cause the user to form an erroneous judgment concerning the driving risk. More specifically, scene D4 represents a state where, for example, the host vehicle 2 is about to change its travel direction in order to turn right, turn left, or travel along a curved travel path. Scene information required for the assumption of scene D4 includes one or more types of information such as sign information, line marking information, traffic information, navigation information, and information about the user status, vehicle speed, steering angle, and the manipulation of the turn switch.

Scene D5 is a driving scene that may accelerate or inhibit the deceleration of the host vehicle 2 by a natural process and is likely to increase the driving risk. More specifically, scene D5 represents a state where, for example, the host vehicle 2 accelerates due, for instance, to a downwardly sloped travel path. Scene D5 also represents a state where the deceleration of the host vehicle 2 is inhibited, that is, for example, a low-μ (friction) travel path is formed by a frozen or unpaved road surface, snow, or rain. Scene information required for the assumption of scene D5 includes one or more types of information such as sign information, traffic information, navigation information, information about the vehicle speed, acceleration, and engine rotation speed, weather information, and information about ambient temperature, tire wheel velocity, and the manipulation of the wiper switch. The low-p (friction) travel path is formed by a road surface that has a low friction coefficient for tire wheels of the host vehicle 2 and increases the rate of skidding of the tire wheels.

Scene D6 is a driving scene that legally requires the host vehicle 2 to decelerate in order to suppress an increase in the driving risk. More specifically, scene D6 represents a state where the host vehicle 2 must stop due, for instance, to a stop sign. Scene D6 also represents a state where the host vehicle 2 must decelerate when, for example, a speed limit is exceeded. Scene information required for the assumption of scene D6 includes one or more types of information such as sign information, traffic information, navigation information, and information about the vehicle speed.

The information acquisition block 542, which is in FIG. 6 as a "scene information acquisition section," acquires information required for driving scene estimation by the scene estimation block 541 as the scene information concerning a driving scene of the host vehicle 2. In this instance, the information acquisition block 542 achieves information acquisition based on output signals of the sensors 40, 41, control information of the vehicle control ECU 42, and information acquired by the surroundings monitoring ECU 31 and the HCU 54.

More specifically, information acquisition required for the assumption of scene D0 is based on information acquired by the surroundings monitoring ECU 31, control information of the integrated control ECU, and output signals of the vehicle speed sensor, cruise control switch, and vehicle speed management switch.

Information acquisition required for the assumption of scene D1 is based on one or more types of information such as information acquired by the surroundings monitoring ECU 31 and the HCU 54 (these elements are hereinafter generically referred to as the control elements 31, 54) and output signals of the radio receiver, vehicle speed sensor, acceleration sensor, rotation speed sensor, illuminance sensor, user status monitor, turn switch, and light switch. Information acquisition required for the assumption of scene D2 is based on one or more types of information such as information acquired by the control elements 31, 54 and output signals of the radio receiver, vehicle speed sensor, acceleration sensor, rotation speed sensor, illuminance sensor, ambient temperature sensor, steering angle sensor, wiper switch, and light switch. Information acquisition required for the assumption of scene D3 is based on one or more types of information such as information acquired by the control elements 31, 54 and an output signal of the radio receiver.

Information acquisition required for the assumption of scene D4 is based on one or more types of information such as information acquired by the control elements 31, 54 and output signals of the radio receiver, user status monitor, vehicle speed sensor, steering angle sensor, and turn switch. Information acquisition required for the assumption of scene D5 is based, for example, on one or more types of information such as information acquired by the control elements 31, 54 and output signals of the radio receiver, vehicle speed sensor, acceleration sensor, rotation speed sensor, ambient temperature sensor, tire wheel velocity sensor, and wiper switch. Information acquisition required for the assumption of scene D6 is based, for example, on one or more types of information such as information acquired by the control elements 31, 54 and an output signal of the vehicle speed sensor.

In addition to acquiring the scene information, the information acquisition block 542, which also functions as a "behavior information acquisition section," acquires behavior information about the user's driving behavior relative to the host vehicle 2 based on output signals of the sensors 40, 41 and control information of the vehicle control ECU 42. In the present embodiment, the manipulations of the pedals 26, 27 and shift lever 29 particularly attract attention as the behavior information about deceleration, which is a driving behavior for assuring the safety of the host vehicle 2. Thus, such behavior information is acquired based on one or more types of information such as control information of the engine control ECU or motor control ECU, control information of the brake control ECU, and output signals of the vehicle speed sensor and shift switch.

A risk determination block 543 functions as a "risk determination section" and determines the driving risk based on the driving scene estimated by the scene estimation block 541 and on the behavior information acquired by the information acquisition block 542. In the present embodiment, the driving risk is classified into three different levels, namely, a low risk Rl, a medium risk Rm, and a high risk Rh as in FIG. 8. Accordingly, the risk determination block 543 includes a plurality of subblocks 545, 546, 547, 548 in order to identify the driving risk as the low risk Rl, the medium risk Rm, or the high risk Rh.

More specifically, when one of scenes D1, D2, D3, D4, D5, and D6 is estimated by the scene estimation block 541, a low determination subblock 545 in FIG. 6 identifies the driving risk as the low risk Rl. As at (a) in FIG. 8, the driving risk is identified as the low risk Rl when it is caused, for example, by a factor C1 represented by scene D5 where the travel path is a downhill. Further, as at (b) in FIG. 8, the driving risk is also identified as the low risk Rl when it is caused, for example, by the factor C1 represented by scene D2 where a parked preceding vehicle exists.

When one of scenes D1, D2, D3, D4, D5, and D6 is estimated by the scene estimation block 541 and found to be indicative of an increase in the driving risk, a medium determination subblock 546 in FIG. 6 identifies the driving risk as the medium risk Rm, which is higher than the low risk Rl. Further, when two or more of scenes D1, D2, D3, D4, D5, and D6 are estimated by the scene estimation block 541, the medium determination subblock 546 also identifies the driving risk as the medium risk Rm. As at (c) in FIG. 8, the driving risk is identified as the medium risk Rm when it is caused, for example, by the factor C1 represented by scene D5 where the travel path is a downhill, and by a factor C2 represented by scene D2 where a parked preceding vehicle exists. Further, as at (d) in FIG. 8, the driving risk is also identified as the medium risk Rm when it is caused, for example, by the factor C1 represented by scene D5 where the travel path is a downhill, and by the factor C2 represented by a worsening tendency in scene D5 where the gradient is increased.

A high determination subblock 547 in FIG. 6 first estimates the driving behavior for the risks Rl, Rm based on the behavior information acquired by the information acquisition block 542. If the estimated driving behavior does not decrease the driving risk, the high determination subblock 547 identifies the driving risk as the high risk Rh, which is higher than the medium risk Rm. In this instance, if a speed limit is estimated to be exceeded in scene D6 and the estimated behavior does not reduce the driving risk, the present embodiment, in particular, identifies the driving risk as the high risk Rh. As at (e) in FIG. 8, the driving risk is identified as the high risk Rh when it is caused, for example, by a factor C3 indicative of acceleration or uniform speed in scene D6 where a speed limit is exceeded, and by the same factors C1, C2 as at (c) in FIG. 8. Further, as at (f) in FIG. 8, the driving risk is also identified as the high risk Rh when it is caused by the factor C3 indicative of acceleration or uniform speed in scene D6 where a speed limit is exceeded, and by the same factors C1, C2 as at (d) in FIG. 8.

A final determination subblock 548 in FIG. 6 makes a final determination of the driving risk based on the results of determination by the other subblocks 545, 546, 547. In this instance, if the driving risk is identified as the low risk Rl by the low determination subblock 545, but is neither identified as the medium risk Rm by the medium determination subblock 546 nor identified as the high risk Rh by the high determination subblock 547, the final determination is made so as to identify the driving risk as the low risk Rl. If the driving risk is identified as the low risk Rl by the low determination subblock 545 and identified as the medium risk Rm by the medium determination subblock 546, but is not identified as the high risk Rh by the high determination subblock 547, the final determination is made so as to identify the driving risk as the medium risk Rm. If the driving risk is identified as the low risk Rl by the low determination subblock 545, identified as the medium risk Rm by the medium determination subblock 546, and identified as the high risk Rh by the high determination subblock 547, the final determination is made so as to identify the driving risk as the high risk Rh.

An information presentation control block 544 functions as an "information presentation control section" and controls assist information presentation by the information presentation subsystem 5 in order to prompt the user to address the driving risk determined by the risk determination block 543. In this instance, the present embodiment, in particular, controls the presentation of assist information on condition that the driving scene be estimated as scene D0 by the scene estimation block 541. That is, the assist information is presented before the activation of the AEB when the driving scene estimated by the scene estimation block 541 represents the independent traveling state of the host vehicle 2. The assist information to be presented is selected from among reference information, suggestion information, and request information, which are shown in FIG. 9, depending on the magnitude of the driving risk finally determined by the final determination subblock 548.

More specifically, the assist information presented for the low risk Rl as a result of final determination is the reference information that is selected by the information presentation control block 544 and presented by the information presentation subsystem 5 in order to let the user recognize the driving risk, which will be helpful for the determination of a driving behavior. The reference information is visually presented by the display unit 5*d* as at (a) in FIG. 9. In this instance, the present embodiment, in particular, visually presents the reference information by allowing the HUD 50 to display a virtual image formed of the warning image 56*c* and the notification image 56*i* as in FIG. 3. The illustrated warning image 56*c* includes a plurality of concentric circular images, and the magnitude of the radius of each circumferential contour indicates a warning level based on the driving risk. The illustrated notification image 56*i* is an oval image displayed above the whole warning image 56*c*, and the positional relationship to the warning image 56*c* indicates a warning level for a preceding obstacle such as a parked vehicle as at (b) in FIG. 8, for example.

Figure 4:
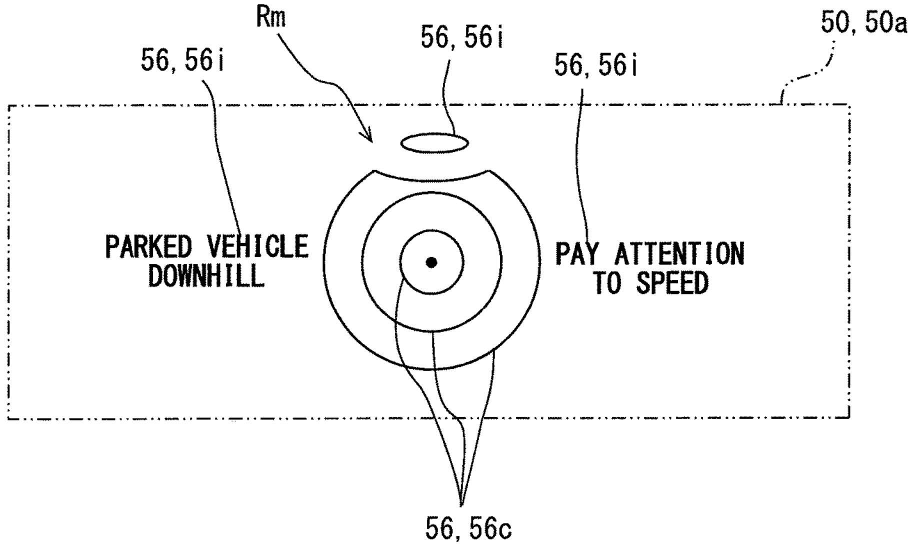
FIG. 4 is a front view illustrating information displayed by the HUD in FIG. 1.

The assist information presented for the medium risk Rm as a result of final determination is the suggestion information that is selected by the information presentation control block 544 and presented by the information presentation subsystem 5 in order to suggest to the user a driving behavior for suppressing an increase in the driving risk. The suggestion information is visually presented by the display unit 5*d* and audibly presented by the sound unit 5*s* as at (b) in FIG. 9. In this instance, the present embodiment, in particular, visually presents the suggestion information by allowing the HUD 50 to display a virtual image formed of the warning image 56*c* and the notification image 56*i* as in FIG. 4. The illustrated notification image 56*i* includes an oval image showing a preceding obstacle, a text image showing a suggested driving behavior, and a text image showing the factors C1, C2 of the driving risks such as a downhill and a parked vehicle as at (c) in FIG. 8. Further, FIG. 4 shows that the warning image 56*c* having a circumferential contour of the greatest radius is deformed based on an increase in the warning level for a preceding obstacle. One or more types of audible information presented from the sound unit 5*s*, such as an intermittent notification sound wave and a notification voice suggesting deceleration or prompting the user to address the driving risk, are added to the visually presented images 56*c*, 56*i*.

Figure 5:
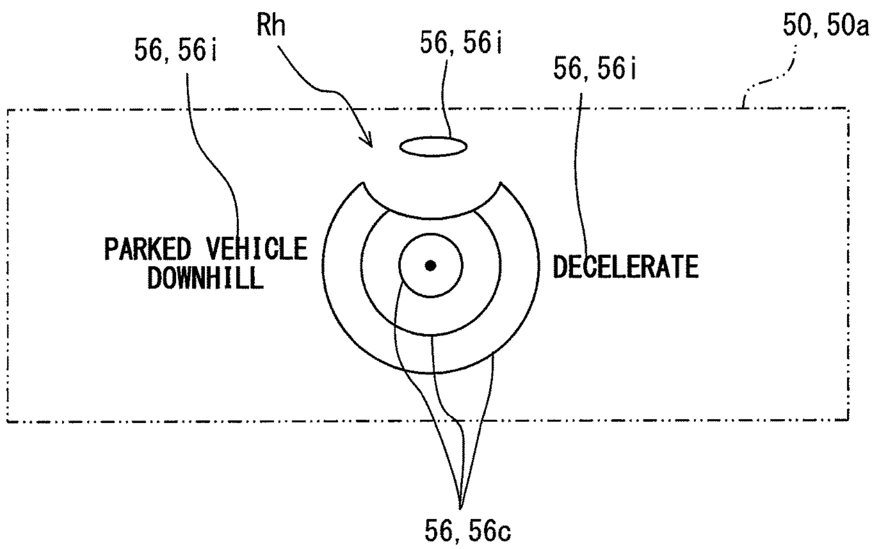
FIG. 5 is a front view illustrating information displayed by the HUD in FIG. 1.

The assist information presented for the high risk Rh as a result of final determination is the request information that is selected by the information presentation control block 544 and presented by the information presentation subsystem 5 in order to request the user to perform a driving behavior to reduce the driving risk. The request information is visually presented by the display unit 5*d*, audibly presented by the sound unit 5*s*, and haptically presented by the vibration unit 5*v* as at (c) in FIG. 9. In this instance, the present embodiment, in particular, visually presents the request information by allowing the HUD 50 to display a virtual image formed of the warning image 56*c* and the notification image 56*i* as in FIG. 5. The illustrated notification image 56*i* includes an oval image showing a preceding obstacle, a text image showing a requested driving behavior, and a text image showing the factors C1, C2 of the driving risks such as a downhill and a parked vehicle as at (e) in FIG. 8. Further, FIG. 5 shows that the warning image 56*c* having a circumferential contour of the greatest radius and the warning image 56*c* having a circumferential contour of the intermediate radius are deformed based on an increase in the warning level for a preceding obstacle. One or more types of audible information presented from the sound unit 5*s*, such as a continuous notification sound wave and a notification voice requesting braking or downshift, are added to the visually presented images 56*c*, 56*i*. Moreover, a notification vibration at a location where the vibration unit 5*v* is installed is haptically added to the visually presented images 56*c*, 56*i*.

No matter which of the reference information, the suggestion information, and the request information is to be visually presented, the HUD 50 displays a virtual image by reading the images 56*c*, 56*i* stored as data in the memory 54*m* of the HCU 54. The memory 54*m* of the HCU 54 and the memories of the other ECUs each include one or more storage media such as a semiconductor memory, a magnetic medium, and an optical medium.

Figure 10:
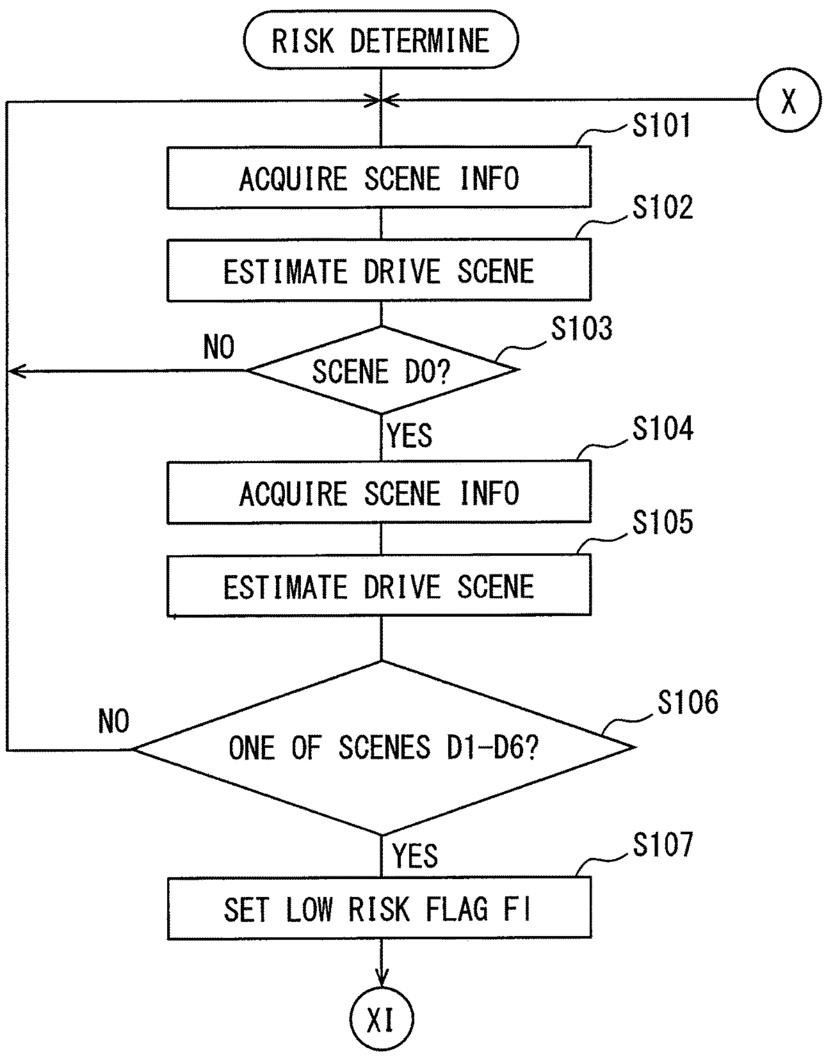
FIG. 10 is a flowchart illustrating a part of a risk determination procedure performed by the HCU in FIG. 2.
Figure 11:
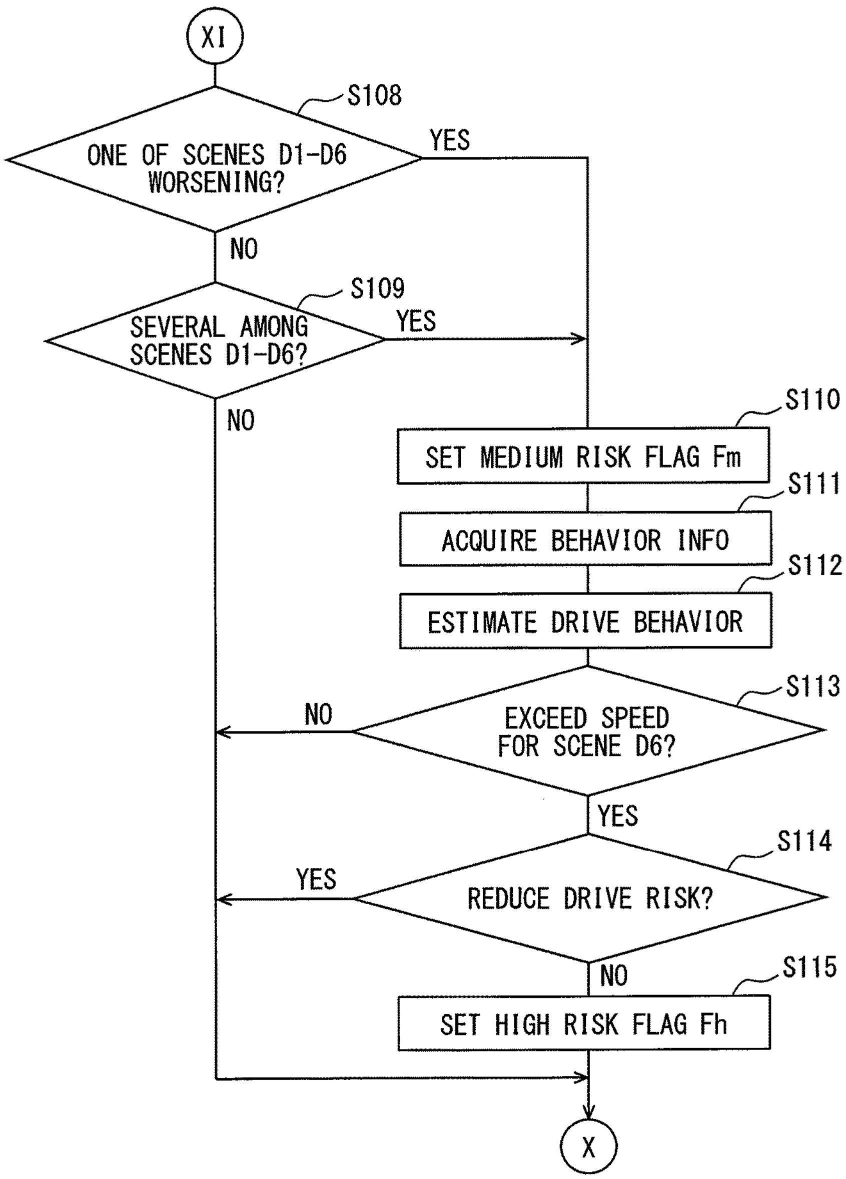
FIG. 11 is a flowchart illustrating the remainder of the risk determination procedure by the HCU in FIG. 2.
Figures 12, 13:
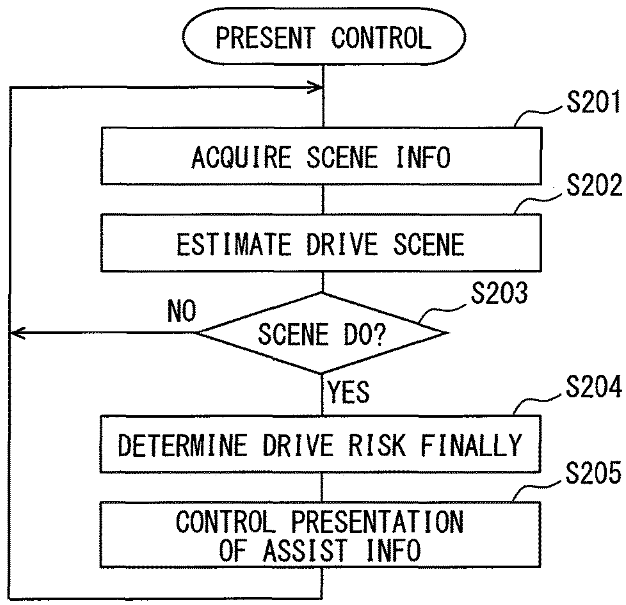
FIG. 12 is a flowchart illustrating a presentation control procedure performed by the HCU in FIG. 2.
FIG. 13 is a diagram illustrating a final determination made in S204 of FIG. 12.

According to the HCU 54, which includes the above-described blocks 541, 542, 543, 544, a risk determination procedure in FIGS. 10 and 11 and a presentation control procedure in FIG. 12 are implemented as a "vehicle speed management method" and described in detail below. The risk determination procedure and the presentation control procedure start when a power switch acting as the occupant sensor 41 turns on, and end when the same switch turns off. When the risk determination procedure or the presentation control procedure starts or ends, a low risk flag Fl, a medium risk flag Fm, and a high risk flag Fh, which are set in the memory 54*m* as in FIG. 13, are reset to "0" (zero). The letter "S" in the risk determination procedure and the presentation control procedure denotes a step.

First of all, the risk determination procedure will be described. As in FIG. 10, in S101 of the risk determination procedure, the information acquisition block 542 acquires scene information required for the assumption of scene D0. In S102, the scene estimation block 541 estimates the current driving scene based on the scene information acquired in S101. In S103, the information presentation control block 544 determines whether the current driving scene estimated in S102 is scene D0. If a negative determination result is obtained, processing returns to S101. By contrast, if an affirmative determination result is obtained in the vehicle speed management enabled state before the activation of the AEB to verify the independent traveling state where the vehicle speed is equal to or higher than the threshold value V0 and the inter-vehicle distance is equal to or longer than the threshold value L0, processing proceeds to S104.

In S104, the information acquisition block 542 acquires scene information required for the assumption of scenes D1, D2, D3, D4, D5, and D6. In S105, the scene estimation block 541 estimates the current driving scene based on the scene information acquired in S104. In S106, the low determination subblock 545 of the risk determination block 543 determines whether the current driving scene estimated in S105 is one of scenes D1, D2, D3, D4, D5, and D6. If a negative determination result is obtained, processing returns to S101. By contrast, if an affirmative determination result is obtained to indicate that the driving risk is a low risk Rl, processing proceeds to S107. In S107, the low determination subblock 545 sets the low risk flag Fl (see FIG. 13) in the memory 54*m* to "1."

After the value of the low risk flag Fl is set in S107, processing proceeds to S108 as in FIG. 11. In S108, the medium determination subblock 546 of the risk determination block 543 determines whether the current driving scene estimated in S105 represents a worsening tendency in one of scenes D1, D2, D3, D4, D5, and D6. If a negative determination result is obtained in S108, processing proceeds to S109. In S109, the medium determination subblock 546 determines whether the current driving scene estimated in S105 is represented by two or more of scenes D1, D2, D3, D4, D5, and D6. If the driving scene to be determined is represented by a worsening tendency or by two or more of scenes D1, D2, D3, D4, D5, and D6, and then an affirmative determination result is obtained in S108 or S109 to indicate that the driving risk is a medium risk Rm, processing proceeds to S110. In S110, the medium determination subblock 546 sets the medium risk flag Fm (see FIG. 13) in the memory 54*m* to "1." If a negative determination result is obtained in S109, processing returns to S101.

After the value of the medium risk flag Fm is set in S110, processing proceeds to S111. In S111, the information acquisition block 542 acquires behavior information required for the assumption of the current driving behavior. In S112, the high determination subblock 547 of the risk determination block 543 estimates the current driving behavior based on the behavior information acquired in S111. In S113, the high determination subblock 547 determines whether the current driving scene estimated in S105 is scene D6 where a speed limit is exceeded. If an affirmative determination result is obtained in S113, processing proceeds to S114. In S114, the high determination subblock 547 determines whether the driving behavior estimated in S112 reduces the driving risk. If a negative determination result is obtained because the estimated driving behavior does not reduce the driving risk caused by an excessive speed, processing proceeds to S115. In S115, the high determination subblock 547 sets the high risk flag Fh (see FIG. 13) in the memory 54*m* to "1." Processing then returns to S101. Processing returns to S101 no matter whether a negative determination result is obtained in S113 or an affirmative determination result is obtained in S114.

Next, the presentation control procedure will be described. As in FIG. 12, in S201 of the presentation control procedure, the information acquisition block 542 acquires scene information required for the assumption of scene D0. In S202, the scene estimation block 541 estimates the current driving scene based on the scene information acquired in S201. In S203, the information presentation control block 544 determines whether the current driving scene estimated in S202 is scene D0. If a negative determination result is obtained, processing returns to S201. By contrast, if an affirmative determination result is obtained, processing proceeds to S204.

In S204, the final determination subblock 548 of the risk determination block 543 makes a final determination of the current driving risk based on the values of the risk flags Fl, Fm, Fh set in the memory 54*m*. More specifically, if the values of the risk flags Fl, Fm, Fh are "1," "0," and "0," respectively, as in FIG. 13, the final determination is made so as to identify the current driving risk as the low risk Rl. If the values of the risk flags Fl, Fm, Fh are "1," "1," and "0," respectively, the final determination is made so as to identify the current driving risk as the medium risk Rm. If the values of the risk flags Fl, Fm, Fh are "1," "1," and "1," respectively, the final determination is made so as to identify the current driving risk as the high risk Rh.

In S205, which follows the final determination of the current driving risk in S204 as in FIG. 12, the information presentation control block 544 controls assist information presentation by the information presentation subsystem 5 in order to prompt the user to address the driving risk. The assist information to be presented in the above instance is selected from among the reference information, suggestion information, and request information based on the magnitude of the finally determined driving risk. More specifically, if the finally determined driving risk is the low risk Rl, the reference information is visually presented as in FIG. 9. If the finally determined driving risk is the medium risk Rm, the suggestion information is visually presented and audibly presented. If the finally determined driving risk is the high risk Rh, the suggestion information is visually presented, audibly presented, and haptically presented. After the reference information, the suggestion information, or the request information is presented as the assist information as above, processing returns to S201.

In the first embodiment, accordingly, S101, S104, and S201 correspond to a "scene information acquisition step," S102, S105, and S202 correspond to a "scene estimation step," and S111 corresponds to a "behavior information acquisition step." Further, in the first embodiment, S106, S107, S108, S109, S110, S112, S113, S114, S115, and S204 correspond to a "risk determination step," and S103, S203, and S205 correspond to a "presentation control step."

(Operational Advantages)

The first embodiment, which has been described above, provides the following operational advantages.

When the estimated driving scene is the independent traveling state of the host vehicle 2, the first embodiment selects the assist information prompting for addressing the driving risk based on the magnitude of the driving risk and causes the information presentation subsystem 5 to present the selected assist information before the activation of the AEB. In this instance, the driving risk is determined based on the driving scene estimated according to the scene information and on the behavior information about the driving behavior. The assist information for managing the vehicle speed is then presented based on the magnitude of the driving risk that is dependent on the driving scene and the driving behavior. The user can thereby be prompted to address the driving risk in order to assure safety and comfort.

Further, according to the first embodiment, the assist information, which is selected from among reference information, suggestion information, and request information and presented by the information presentation unit, relates to the driving risk determined based on the driving scene and behavior information. Therefore, when the presented assist information is the reference information related to a driving risk identified as the low risk Rl, the sensitivity for safety assurance can be increased at an early stage by reminding the user of the driving risk, which is helpful for determining the driving behavior. When the presented assist information is the suggestion information related to the medium risk Rm, which is a higher driving risk than the low risk Rl, a concrete and objective index for safety assurance can be presented by suggesting to the user a driving behavior for suppressing an increase in the driving risk. When the presented assist information is the request information related to the high risk Rh, which is a higher driving risk than the medium risk Rm, the user can be strongly urged to assure safety against danger by requesting the user to perform a driving behavior that reduces the driving risk.

Furthermore, according to the first embodiment, when the driving risk is identified as the low risk Rl, the selected reference information is visually presented by the display unit 5*d* (HUD 50). This reduces the trouble of addressing the driving risk because the user merely has to visually recognize the visually presented reference information. However, the user can become aware of the driving risk and increase the sensitivity for safety assurance. When the driving risk is identified as the medium risk Rm, the selected suggestion information is visually presented by the display unit 5*d* (HUD 50) and audibly presented by the sound unit 5*s*. This enables the user to visually recognize the visually presented suggestion information and audibly recognize the same information, grasp a concrete and objective index based on an increase in the driving risk, and perform a driving behavior appropriate for safety assurance. When the driving risk is identified as the high risk Rh, the selected request information is visually presented by the display unit 5*d* (HUD 50), audibly presented by the sound unit 5*s*, and haptically presented by the vibration unit 5*v*. Thus, the user not only visually recognizes the visually presented request information, but also audibly recognizes the audibly presented request information and haptically recognizes the haptically presented request information. This enables the user to become strongly conscious of safety assurance against danger and surely perform such a driving behavior as to reduce the driving risk.

Moreover, when the estimated driving scene is one of scenes D1, D2, D3, D4, D5, and D6, the first embodiment identifies the driving risk as the low risk Rl. Therefore, even when the information required for driving the host vehicle 2 is misinterpreted, missing, or increased, the reference information can be presented to increase the user's sensitivity for safety assurance. Further, even when the number of manipulation tasks required for driving the host vehicle 2 is increased, the reference information can be presented to increase the user's sensitivity for safety assurance. Furthermore, even when a natural process accelerates the host vehicle 2 or inhibits its deceleration, the reference information can be presented to increase the user's sensitivity for safety assurance. In addition, even when the deceleration of the host vehicle 2 is legally required, the reference information can be presented to increase the user's sensitivity for safety assurance.

Additionally, when the estimated driving scene is one of scenes D1, D2, D3, D4, D5, and D6 and indicative of a worsening tendency in the driving risk, the first embodiment identifies the driving risk as the medium risk Rm. Therefore, even when the driving risk is increased due to a worsening tendency of the driving scene, the presented suggestion information enables the user to grasp a concrete and objective index for safety assurance and perform such a driving behavior as to suppress an increase in the driving risk. Further, even when two or more driving scenes out of scenes D1, D2, D3, D4, D5, and D6 are estimated, the first embodiment identifies the driving risk as the medium risk Rm. Therefore, even when two or more driving scenes having the low risk Rl are simultaneously encountered to increase the driving risk, the presented suggestion information enables the user to grasp a concrete and objective index for safety assurance and perform such a driving behavior as to suppress an increase in the driving risk.

Besides, when a behavior estimated based on the behavior information as a driving behavior for the low risk Rl and the medium risk Rm does not reduce the driving risk, the first embodiment identifies the driving risk as the high risk Rh. Therefore, even when the driving behavior performed against danger is inappropriate, the presented request information enables the user to perform an appropriate driving behavior that reduces the driving risk for safety assurance.

Second Embodiment

Figure 14:
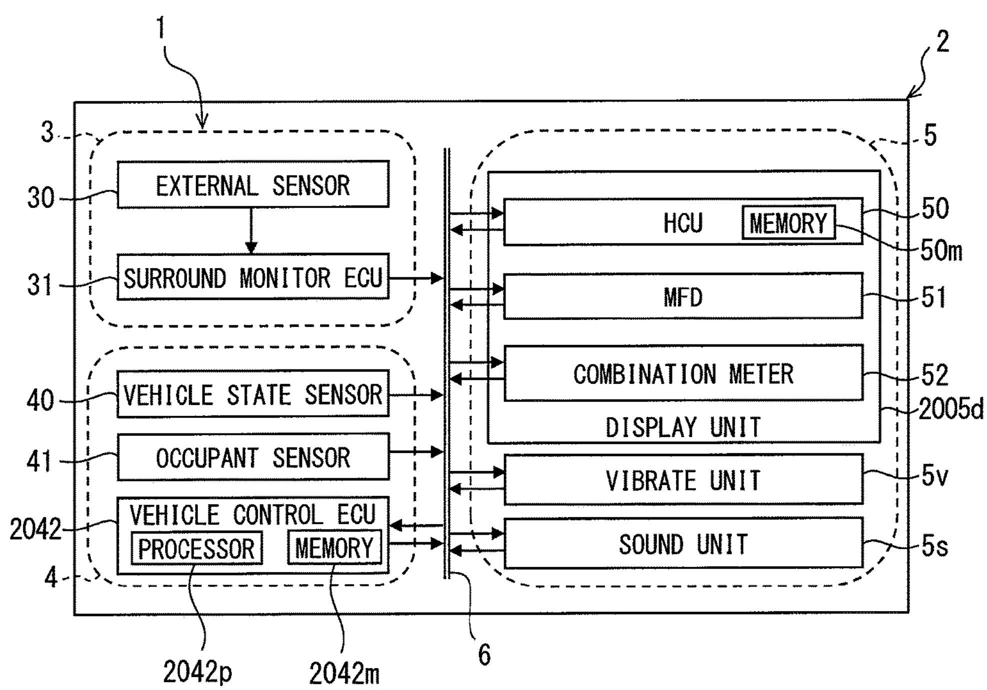
FIG. 14 is a block diagram illustrating the travel assist system according to a second embodiment.

As in FIG. 14, a second embodiment of the present disclosure is a modification of the first embodiment.

A display unit 2005*d* in the second embodiment does not include the HCU 54. In the second embodiment, therefore, a vehicle control ECU 2042, such as an integrated control ECU, functions as the "vehicle speed management apparatus." Therefore, when a processor 2042*p* in the vehicle control ECU 2042 executes the vehicle speed management program, the blocks 541, 542, 543, 544 are built to implement the individual procedures as the "vehicle speed management method," as is the case with the first embodiment. In this instance, the risk flags Fl, Fm, Fh are set, for example, in a memory 2042*m* included, for example, in the vehicle control ECU 2042, which acts as the "vehicle speed management apparatus." Data on the images 56*c*, 56*i* is stored, for example, in the memory 2042*m* of the vehicle control ECU 2042 or in a memory 50*m* in the HUD 50. The other elements of the vehicle control ECU 2042 and HUD 50 are the same as the counterparts in the first embodiment.

Consequently, the above second embodiment provides the same operational advantages as the first embodiment.

Third Embodiment

Figure 15:
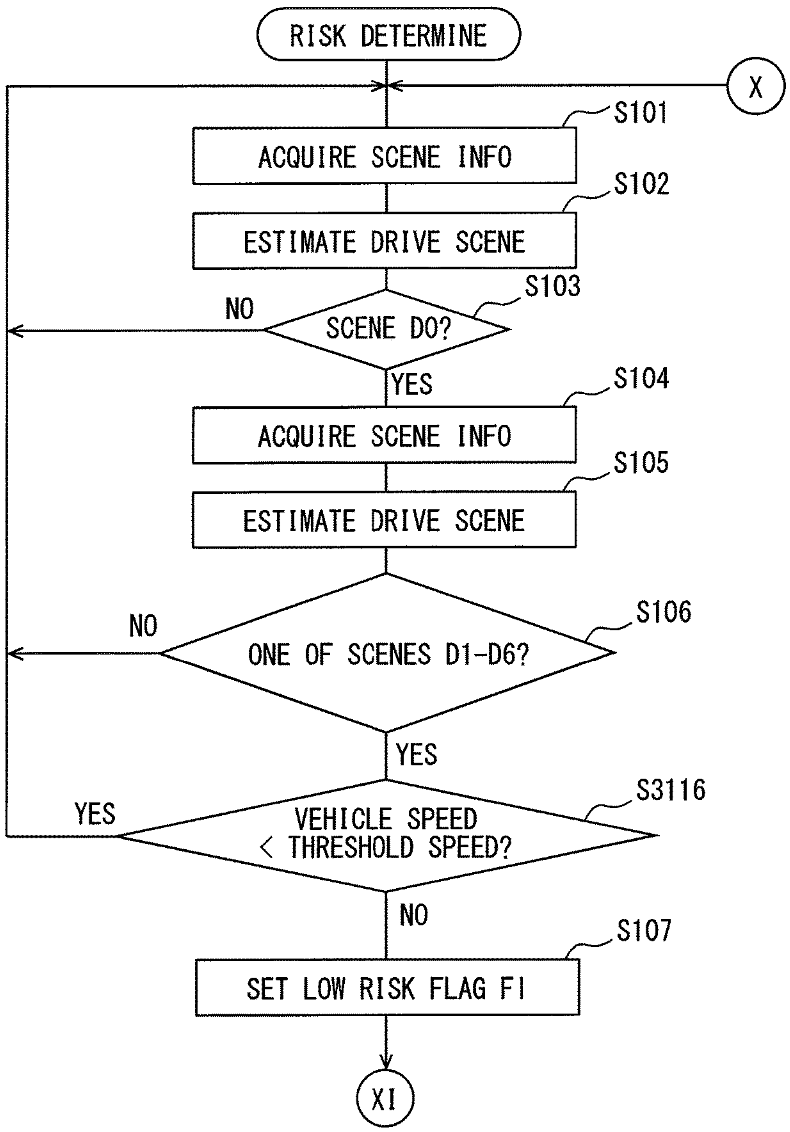
FIG. 15 is a flowchart illustrating a part of the risk determination procedure performed by the HCU according a third embodiment.

As in FIG. 15, a third embodiment of the present disclosure is a modification of the first embodiment.

When the driving scene is one of scenes D1, D2, D3, D4, D5, and D6 in FIG. 7, the first embodiment sets the low risk flag Fl and visually presents the reference information. However, the D1, D2, D3, D4, D5, and D6 driving scenes are frequently encountered in daily life. Therefore, if the low risk flag Fl is set to visually present the reference information each time such a driving scene is encountered, the user might feel bothered. Particularly, if the reference information is visually presented while the user is paying due attention to the vehicle speed during driving, the use might feel even more bothered. The third embodiment addresses this issue by limiting the conditions under which the low risk flag Fl is set in risk determination.

More specifically, as in FIG. 15, whether the current vehicle speed is lower than a predetermined threshold speed is determined in S3116 after the driving scene is identified in S106 as one of scenes D1, D2, D3, D4, D5, and D6. If the current vehicle speed is determined in S3116 to be lower than the predetermined threshold speed, processing returns to S101. By contrast, if the current vehicle speed is equal to or higher than the predetermined threshold speed, processing proceeds to S107, and the low risk flag Fl is set. Here, the predetermined threshold speed is lower than a speed limit. If, for example, the speed limit is 60 km/h, the predetermined threshold speed is 40 km/h.

Even when a frequent day-to-day driving scene is encountered, the above-described scheme inhibits a flag indicative of the low risk Rl from being set unnecessarily to visually present the reference information as far as the user maintains a vehicle speed appropriate for safety assurance. This decreases the possibility of the user being bothered. In the third embodiment, S106, S107, S108, S109, S110, S112, S113, S114, S115, S204, and S3116 correspond to the "risk determination step."

The third embodiment inhibits the reference information from being unnecessarily presented in a visual manner by limiting the conditions under which the low risk flag Fl is set. Alternatively, however, presentation control in FIG. 12 may be exercised to set presentation conditions instead of setting the low risk flag. The same effect is obtained if, for example, whether the vehicle speed is lower than the safe speed is determined in S205 of FIG. 12 in order to define the conditions under which the reference information is presented.

Alternative Embodiments

While the present disclosure has been described in conjunction with a plurality of foregoing embodiments, the present disclosure is not limited to the foregoing embodiments. The present disclosure is also applicable to various other embodiments and various combinations of them without departing from the spirit and scope of the present disclosure.

As a first modification, the driving risk may be classified into a plurality of different levels, instead of three different levels, in order to present the assist information for each of the different risk levels. For example, only two levels of the low risk Rl, the medium risk Rm, and the high risk Rh may be adopted as the driving risk levels to present two types of assist information, such as the reference information, the suggestion information, and the request information, in correspondence with the adopted driving risk levels.

As a second modification, when the driving risk is the low risk Rl, the reference information may be presented in at least either an audible manner or a haptic manner instead of or in addition to the visual presentation of the reference information. As a third modification, when the driving risk is the medium risk Rm, the suggestion information may be haptically presented instead of or in addition to at least either the visual presentation or audible presentation of the suggestion information. As a fourth modification, when the driving risk is the high risk Rh, the suggestion information may be presented in one or two of a visual manner, an audible manner, and a haptic manner. As a fifth modification, the reference information, the suggestion information, and the request information may be presented in a manner selected by the display setting switch as the occupant sensor 41.

Figure 16A:
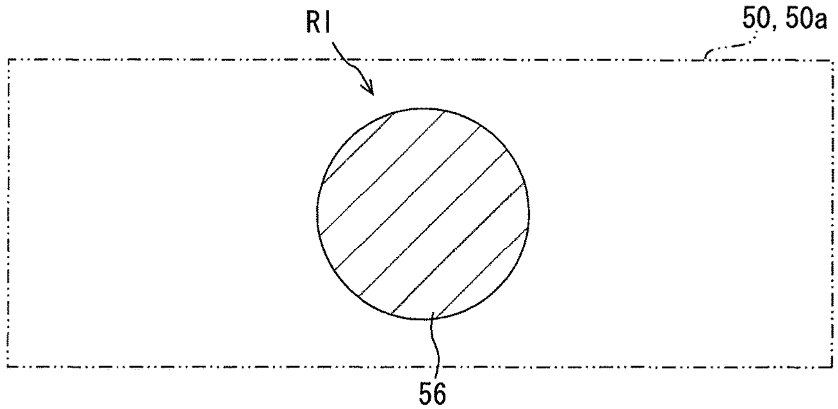
FIG. 16A is a front view illustrating a modification of FIG. 3.
Figure 16B:
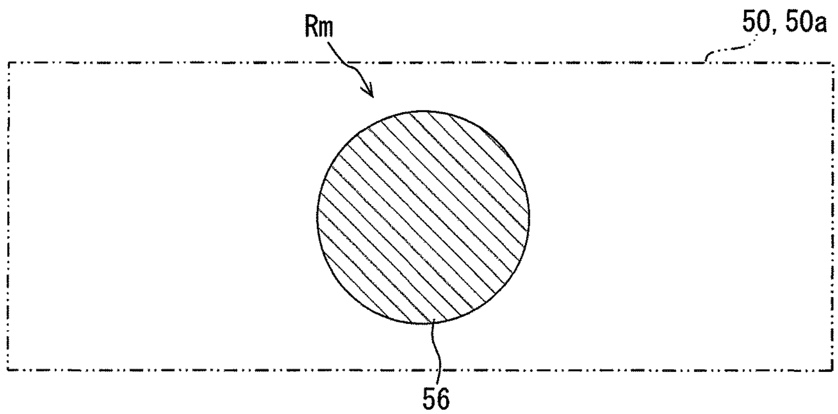
FIG. 16B is a front view illustrating a modification of FIG. 4.
Figure 16C:
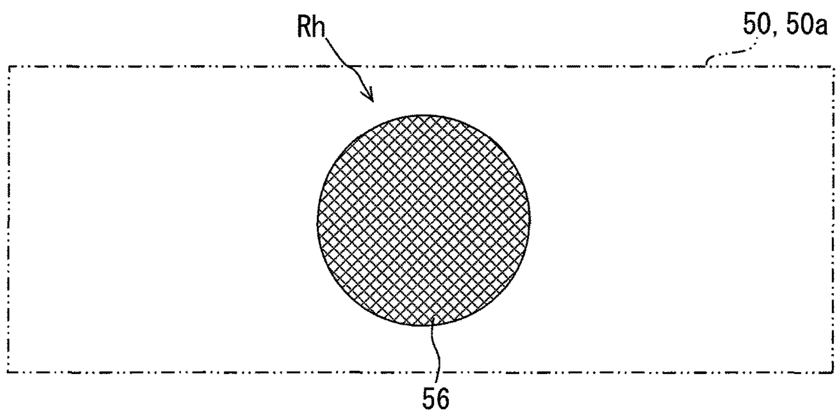
FIG. 16C is a front view illustrating a modification of FIG. 5.

As a sixth modification, at least either one of the MFD 51 and the combination meter 52 may visually present the assist information instead of or in addition to the visual presentation by the HUD 50. As a seventh modification, an image different from the warning image 56*c* and the notification image 56*i* may be used to visually present the assist information. The seventh modification is illustrated in FIGS. 16A, 16B, and 16C. FIG. 16A shows that the reference information is visually presented by using a green image 56 marked by lower left to upper right hatching. FIG. 16B shows that the suggestion information is visually presented by using a yellow image 56 marked by lower right to upper left hatching. FIG. 16C shows that the request information is visually presented by using a red image 56 marked by cross-hatching.

As an eighth modification, only some driving scenes out of scenes D1, D2, D3, D4, D5, and D6 may be estimated in order to identify the driving risk as the low risk Rl or the medium risk Rm. As a ninth modification, an alternative driving scene may be estimated instead of or in addition to at least one of scenes D1, D2, D3, D4, D5, and D6 in order to identify the driving risk as the low risk Rl or medium risk Rm. As a tenth modification, the driving scene to be estimated to identify the driving risk as the low risk Rl or the medium risk Rm may be selected based on the manipulation of the display setting switch.

As an eleventh modification, the driving risk may be identified as the medium risk Rm only when one of the driving scenes such as scenes D1, D2, D3, D4, D5, and D6 exhibits a worsening tendency. As a twelfth modification, the driving risk may be identified as the medium risk Rm only when two or more driving scenes such as scenes D1, D2, D3, D4, D5, and D6 are estimated.

As a thirteenth modification, when an estimated behavior does not reduce the driving risk, the driving risk may be identified as the high risk Rh without regard to an excessive speed above a speed limit in scene D6. As a fourteenth modification, when an estimated behavior does not reduce the driving risk, the driving risk may be identified as the high risk Rh on condition that a specific driving scene other than scene D6 be estimated.

As a fifteenth modification, when the emergency control condition is established, the integrated control ECU may be operated as the "emergency control unit" to let the information presentation subsystem 5 exercise an FCW (Front Collision Warning), in order to reduce or avoid collision damage between the host vehicle 2 and a preceding obstacle.

In the above instance, the emergency control condition for the issuance of the FCW is that the TTC is decreased, for example, to 10 seconds or less. Accordingly, when the integrated control ECU exercises both the AEB and the FCW, the fifteenth modification adopts scene D0 that represents a case where the host vehicle 2 is in the independent traveling state while vehicle speed management is enabled before at least one of the AEB and FCW is exercised. Meanwhile, when the integrated control ECU exercises only the FCW, the fifteenth modification adopts scene D0 that represents a case where the host vehicle 2 is in the independent traveling state while vehicle speed management is enabled before the FCW is exercised.

As a sixteenth modification, the vehicle speed management enabled state may be achieved, without incorporating the cruise control switch, simply by turning on the vehicle speed management switch before the AEB is exercised. As a seventeenth modification, the vehicle speed management enabled state may be automatically achieved, without incorporating the vehicle speed management switch, by turning off the cruise control switch before the AEB is exercised. As an eighteenth modification, the vehicle speed management enabled state may be automatically achieved, before the AEB is exercised, without incorporating the cruise control switch and the vehicle speed management switch. As a nineteenth modification, only an inter-vehicle distance of equal to or longer than the threshold value L0 may be adopted as the condition for the independent traveling state without adopting a vehicle speed of equal to or higher than the threshold value V0.

Figure 17:
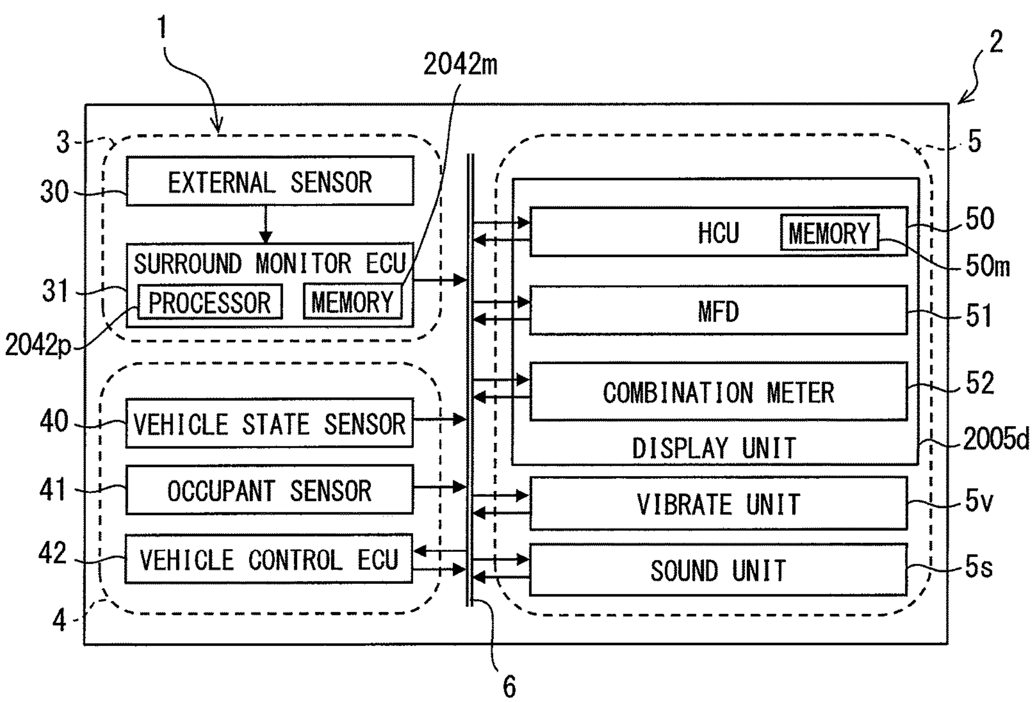
FIG. 17 is a block diagram illustrating a modification of FIG. 14.

As a twentieth modification, when the HCU 54 is not incorporated as is the case with the second embodiment, one or more of the surroundings monitoring ECU 31 and a display ECU for controlling the display elements 50, 51, 52 may function as the "vehicle speed management apparatus." That is, processors included in such one or more types of ECUs may be used to build the blocks 541, 542, 543, 544 to implement the individual procedures as the "vehicle speed management method." FIG. 17 illustrates the twentieth modification where the function of the "vehicle speed management apparatus" is exercised by the surroundings monitoring ECU 31 including the processor 2042*p* and the memory 2042*m*, which are described in conjunction with the second embodiment.

As a twenty-first modification, when the cruise control switch is turned on by the user, an adaptive cruise control (ΔCC) may be automatically exercised to forcibly control the inter-vehicle distance or the vehicle speed within a particular vehicle speed range such as a high speed range.

While the present disclosure has been described with reference to embodiments thereof, it is to be understood that the disclosure is not limited to the embodiments and constructions. The present disclosure is intended to cover various modification and equivalent arrangements. In addition, the various combinations and configurations, other combinations and configurations, including more, less or only a single element, are also within the spirit and scope of the present disclosure.

The invention claimed is:

1. A vehicle speed management apparatus that manages a vehicle speed in a host vehicle, the host vehicle including an emergency control unit and an information presentation unit, the emergency control unit providing an operation in order to reduce or avoid collision damage to a preceding obstacle, the information presentation unit presenting information, the vehicle speed management apparatus comprising:

at least one processor that includes a scene information acquisition section that acquires scene information about a driving scene of the host vehicle driven by a user, a scene estimation section that estimates the driving scene based on the scene information acquired by the scene information acquisition section, a behavior information acquisition section that acquires behavior information about a driving behavior of the host vehicle driven by the user, a risk determination section that determines a driving risk of the host vehicle driven by the user, based on the driving scene estimated by the scene estimation section and on the behavior information acquired by the behavior information acquisition section, and an information presentation control section that controls a presentation of assist information by the information presentation unit in order to prompt the user to address the driving risk, wherein when the driving scene estimated by the scene estimation section represents an independent traveling state of the host vehicle, the information presentation control section selects, based on a magnitude of the driving risk determined by the risk determination section, the assist information to be presented by the information presentation unit before the operation by the emergency control unit, wherein:

the assist information responding to the driving risk identified as a low risk is reference information that causes the user to recognize the driving risk, the driving risk that the user refers to in determining the driving behavior;

the assist information responding to the driving risk identified as a medium risk is suggestion information that suggests to the user the driving behavior to suppress an increase in the driving risk, the medium risk being higher than the low risk;

the assist information responding to the driving risk identified as a high risk is request information that requests the user to perform the driving behavior to reduce the driving risk, the high risk being higher than the medium risk; and the information presentation control section selects the reference information, the suggestion information, or the request information as the assist information responding to the driving risk determined by the risk determination section, wherein:

when the driving risk determined by the risk determination section is the low risk, the information presentation control section causes the information presentation unit to provide visual presentation of the reference information selected as the assist information;

when the driving risk determined by the risk determination section is the medium risk, the information presentation control section causes the information presentation unit to provide visual and audible presentation of the suggestion information selected as the assist information; and when the driving risk determined by the risk determination section is the high risk, the information presentation control section causes the information presentation unit to provide visual, audible, and haptic presentation of the request information selected as the assist information.

2. The vehicle speed management apparatus according to claim 1, wherein:

the driving scene includes a first driving scene that leads to misinterpretation of information required for driving the host vehicle, a second driving scene that causes lack of information required for driving the host vehicle, a third driving scene that increases an amount of information required for driving the host vehicle, a fourth driving scene that increases a number of manipulation tasks required for driving the host vehicle, a fifth driving scene that accelerates or inhibits deceleration of the host vehicle by a natural process, and a sixth driving scene that requires legal deceleration of the host vehicle; and when the driving scene estimated by the scene estimation section is one of the first to sixth driving scenes, the risk determination section determines that the driving risk is the low risk.

3. The vehicle speed management apparatus according to claim 2, wherein, when one of the first to sixth driving scenes is estimated by the scene estimation section and the vehicle speed of the host vehicle is equal to or higher than a predetermined speed, the risk determination section determines that the driving risk is the low risk.

4. The vehicle speed management apparatus according to claim 2, wherein, when a worsening tendency in the driving risk is exhibited by one of the first to sixth driving scenes that is estimated by the scene estimation section, or when two or more of the first to sixth driving scenes are estimated by the scene estimation section, the risk determination section determines that the driving risk is the medium risk.

5. The vehicle speed management apparatus according to claim 4, wherein, when the user's driving behavior estimated against the low risk and the medium risk based on the behavior information acquired by the behavior information acquisition section fails to reduce the driving risk, the risk determination section determines that the driving risk is the high risk.

6. A vehicle speed management method of managing a vehicle speed in a host vehicle, the host vehicle including an emergency control unit providing an operation in order to reduce or avoid collision damage to a preceding obstacle and an information presentation unit presenting information, the vehicle speed management method being executed by at least one processor, the vehicle speed management method comprising:

a scene information acquiring that acquires scene information about a driving scene of the host vehicle driven by a user;

a scene estimating that estimates the driving scene based on the scene information acquired;

a behavior information acquiring that acquires behavior information about a driving behavior of the host vehicle driven by the user;

a risk determining that determines a driving risk of the host vehicle driven by the user, based on the driving scene estimated and on the behavior information acquired; and an information presentation controlling that controls a presentation of assist information by the information presentation unit in order to prompt the user to address the driving risk, and selects the assist information to be presented by the information presentation unit before the operation by the emergency control unit based on a magnitude of the driving risk determined when the driving scene estimated by the scene estimation step represents an independent traveling state of the host vehicle, wherein:

the assist information responding to the driving risk identified as a low risk is reference information that causes the user to recognize the driving risk, the driving risk that the user refers to in determining the driving behavior;

the assist information responding to the driving risk identified as a medium risk is suggestion information that suggests to the user the driving behavior to suppress an increase in the driving risk, the medium risk being higher than the low risk;

the assist information responding to the driving risk identified as a high risk is request information that requests the user to perform the driving behavior to reduce the driving risk, the high risk being higher than the medium risk; and the reference information, the suggestion information, or the request information is selected as the assist information responding to the driving risk determined, wherein:

when the driving risk determined is the low risk, the information presentation unit is caused to provide visual presentation of the reference information selected as the assist information;

when the driving risk determined is the medium risk, the information presentation unit is caused to provide visual and audible presentation of the suggestion information selected as the assist information; and when the driving risk determined is the high risk, the information presentation unit is caused to provide visual, audible, and haptic presentation of the request information selected as the assist information.

* * * * *